UNITED STATES PATENT OFFICE.

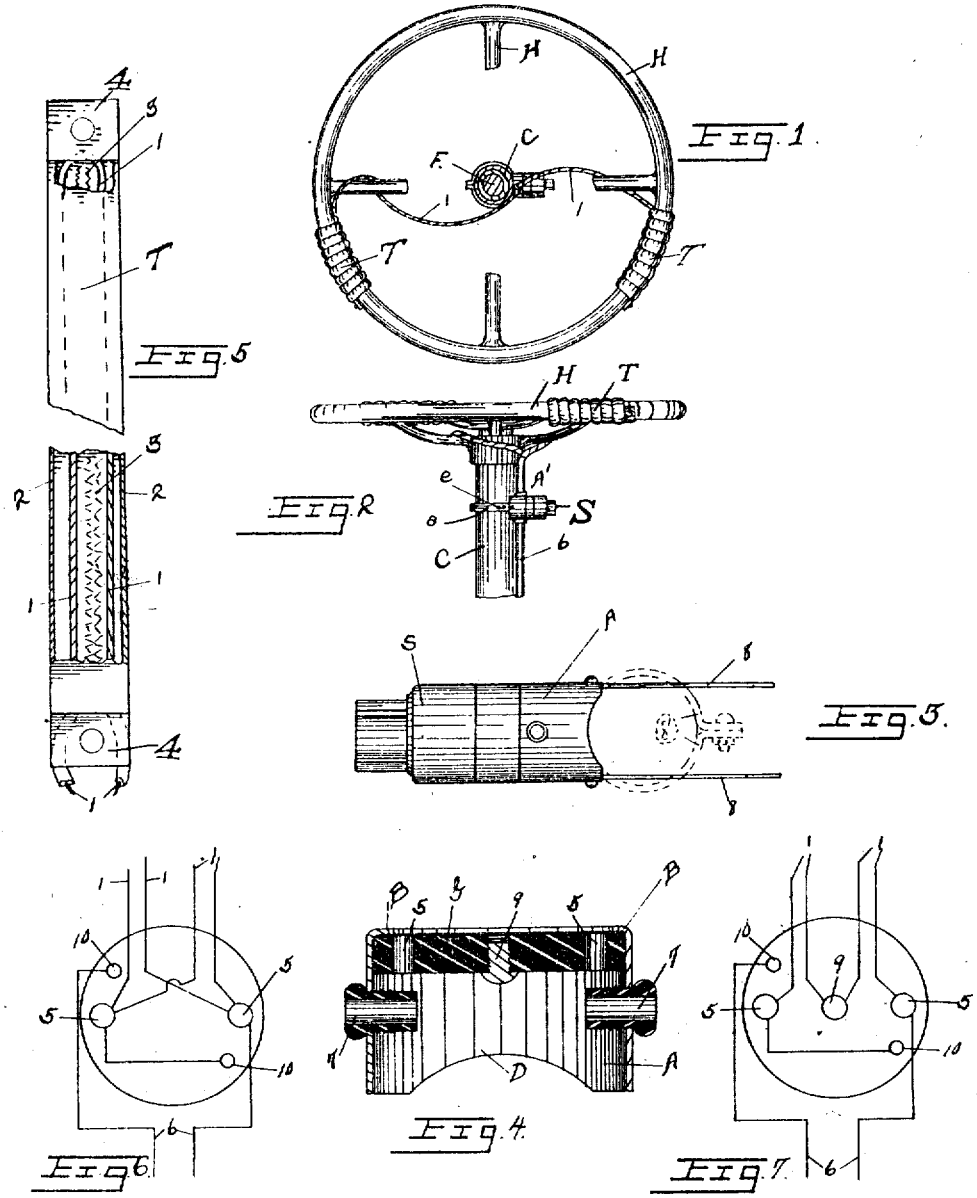

WILLIAM P. BARTON, OF SALT LAKE CITY, UTAH.

STEERING-WHEEL HEATER.

1,269,776.

Specification of Letters Patent.  Patented June 18, 1918.

Application filed August 2, 1916, Serial No. 112,849. Renewed January 8, 1918. Serial No. 210,945.

*To all whom it may concern:*

Be it known that I, WILLIAM P. BARTON, a citizen of the United States, residing at Salt Lake City, in the county of Salt Lake and State of Utah, have invented certain new and useful Improvements in Steering-Wheel Heaters, of which the following is a specification.

My invention relates to heating elements, and has for its object to provide a flexible heating element in the form of a tape which may be wound on the steering wheel of road vehicles and other similar manually operated parts of machinery to provide warmth for the hands of the operator in extremely cold weather.

These objects I accomplish with the device illustrated in the accompanying drawings in which similar letters and numerals of reference indicate like parts throughout the several figures and as described in the specification forming a part of this application and pointed out in the appended claim.

In the drawings in which I have shown a substantial embodiment of my invention, Figure 1 is a plan view of the steering wheel of a road vehicle, parts cut away and parts in section, with my device in place thereon. Fig. 2 is an elevation of the steering wheel of a road vehicle with my device in place thereon. Fig. 3 is a plan view of the securing parts of the device. Fig. 4 is a section of the holding cylinder showing the insulating members. Fig. 5 is a plan view of the heating tape, parts shown in section and parts in dotted lines. Fig. 6 is a diagrammatic view showing the electrical connections when connected in multiple, and Fig. 7 is a diagrammatic view showing the electrical connections in series.

During extremely cold weather the operation of automobiles and other road vehicles is often inconvenient and uncomfortable, even though the operator may protect his hands with gloves; and my purpose is to provide a flexible tape that may be wound around or on the steering wheel and heated by an electric current whereby the hands of the operator may be warmed and without interfering with the operation of the automobile, and which tape and connections may be easily and quickly detached when the weather conditions are such that it is not desired.

I provide a resistance element in the form of a wire 1 which is placed between sheets of asbestos, shown at 2, which sheets are stitched together with longitudinal rows of stitches 3 and making out of the said wire and abestos a tape T. The prefered form is shown in Fig. 5 wherein the asbestos is in the form of a flattened tube 2' in which the wire 1 is inserted.

The wire 1 is in the form of a loop and the flattened asbestos tube is then stitched by longitudinal rows of stitches 3. As the tape is subjected to constant wear I provide a thin and insulating paint with which the stitch tube is covered. Fastening clamps 4 are secured on the ends of the said tape T having holes therein through which screws are inserted to hold the tape in place. The free ends of the wire 1 are suitably covered with insulating material where desired, then are passed through the switch and connections A, and lead by the wires 6 to the source of electric energy, which is not shown. In order that the device may be readily fastened on and taken off of any steering wheel, and the electric circuit completed or broken without inconvenience to the operator, and without stopping the automobile or other road vehicle, I provide a cylinder A, having an inwardly turned flange B at one end and the other end cut as an inwardly turned arc D. A disk of insulating material G, which bears against the flange B, is carried in said cylinder A, and to which a common two point switch S is fastened by tap screws passed through the holes 5. Externally threaded sleeves 7 are screwed in the wall of said cylinder A and perforated metal straps 8 are bolted through said sleeves 7 to said cylinder A. The said straps 8 are bent to partially encircle the casing C of the steering wheel shaft F and their free ends are bolted together by a bolt through one of the perforations in said straps 8. The other perforations e are in the attached end portion of each of said straps and are provided therein in order that the said cylinder A may be fastened on casings of different diameters, by using only enough of each of said straps together with the arc shaped cut D on the end of said cylinder as will tightly encircle said casing C.

The tap screws used in the holes 5 in said insulating disk G act as contact screws by which the ends of wire 1 are led to the contact posts in the said switch S, and said wires may be connected in multiple as shown in Fig. 6 or in series as shown in Fig. 7, by using another contact screw 9 if such connection is desired. The make and break of the electric circuit is by means of the switch bridging the gap between the screws in the holes 5 and holes 10.

Having thus described my invention I desire to secure by Letters Patent and claim:—

A heating element for steering wheels consisting of a resistance wire; an asbestos covering therefor, which is given a tape form and held in place on said wire by rows of longitudinal stitches; fastening clamps on the ends of said asbestos covering; an electric switch electrically connected with said wire; a cylindrical casing; an insulating disk carried in said casing to which said switch is fastened; perforated metal strips having one end of each secured to said casing; and means to fasten said strips around the steering wheel shaft adjacent said steering wheel.

In testimony whereof I have affixed my signature in presence of a witness.

WILLIAM P. BARTON.

Witness:
SAM RANEY.